United States Patent Office 3,173,909
Patented Mar. 16, 1965

3,173,909
N-SUBSTITUTED DERIVATIVES OF 3-AZABICYCLO[3.2.2]NONANE
Vada L. Brown, Jr., and Theodore E. Stanin, Kingsport, Tenn., assignors to Eastman Kodak Company, Rochester, N.Y., a corporation of New Jersey
No Drawing. Filed May 31, 1962, Ser. No. 198,774
5 Claims. (Cl. 260—239)

This invention relates to new chemical compounds and more particularly to novel N-hydroxyalkyl substituted derivatives and related derivatives of 3-azabicyclo[3.2.2]nonane.

The synthesis of 3-azabicyclo[3.2.2]nonane is described in the patent application of Brown, Smith and Stanin, Serial No. 82,373, filed January 13, 1961, and now abandoned, and in the continuation-in-part thereof, Serial No. 196,494, filed May 21, 1962. The compound can be prepared by the catalytic deamination of 1,4-cyclohexanebis(methylamine) in vapor phase. The procedure comprises feeding 1,4-cyclohexanebis(methylamine) with nitrogen at a constant rate through a heated catalyst bed, e.g., catalytic alumina, at a temperature of 350 to 450° C.

The compounds of the invention include (I) N-hydroxyalkyl substituted derivatives of 3-azabicyclo[3.2.2]nonane. Also included are the related halogen substituted derivatives (II) and the related carboxylic acid esters (III) of the alcohols (I). Compounds of the invention include those of the following general formulae, and quaternary ammonium salts thereof:

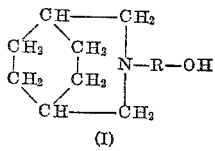

(I)

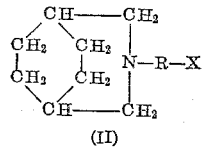

(II)

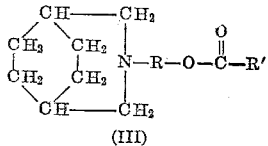

(III)

wherein R is an alkylene radical, R' is an alkyl or aralkyl radical and X is halogen.

The radical R can be any straight or branched chain alkylene radical having for example, 1 to about 8 carbon atoms but preferably R is a lower alkylene radical having 1 to about 4 carbon atoms. R' can be the alkyl residue of an alkanoic acid, such residue having 1 to about 8 carbon atoms but preferably is a lower alkyl radical of 1 to about 4 carbon atoms. R' can also be the aralkyl residue of an aryl substituted alkanoic acid of which phenyl acetic acid, diphenyl acetic acid, and gamma-phenyl butyric acid are examples. Preferred examples of R' as an aralkyl radical are radicals having an alkyl group of 1 to 4 carbon atoms with 1 or 2 phenyl substituents. Preferred halogens represented by X are chlorine and bromine.

The compounds of the invention have pharmaceutical utility and are particularly useful in pharmaceutical research and as pharmaceutical intermediates. Compounds of the invention and their derivatives find use as antispasmodics and as local anesthetics.

The compounds of the invention are often used most conveniently as pharmaceuticals in the form of water soluble, non-toxis quaternary ammonium salts and such salts are within the scope of the invention. These include acid addition salts prepared from acids which produce salts whose anions are relatively innocuous to animal organisms in therapeutic doses of the salts. Suitable acid addition salts include those derived from mineral acids such as hydrochloric, hydrobromic, hydriodic, nitric, phosphoric and sulfuric acid and organic acids such as acetic, citric, tartaric and lactic acids and the like. Such acids produce the hydrochloride, hydrobromide, hydriodide, nitrate, phosphate or acid phosphate, sulfate or bisulfate, acetate, citrate or acid citrate, tartrate or bitartrate, and lactate salts, respectively.

The hydroxyalkyl-substituted compounds of the invention are prepared by the reaction of 3-azabicyclo[3.2.2]nonane with a hydroxy halogen compound such as ethylene bromohydrin or with an alkylene oxide such as ethylene oxide or propylene oxide. The reaction can be carried out by mixing the reactants in approximately equimolar proportions preferably with stirring and with mild heating.

The following examples illustrate two reactions for the preparation of a Type I compound of the invention.

EXAMPLE 1

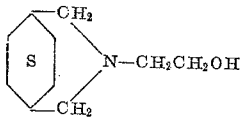

3-azabicyclo[3.2.2]nonane-3-ethanol

*Procedure.*—To a 200 cc. flask equipped with stirrer, condenser, addition funnel and thermometer was added 62.5 g. (0.5 mole) of 3-azabicyclo[3.2.2]nonane. The stirrer was started and 65 g. (0.5 mole) of ethylene bromohydrin was added over a 13 minute period. The temperature rose from 30° C. to 140° C. After the reaction mixture began to solidify, stirring was discontinued. The material was then heated on a steam bath for 23 hours 40 minutes, after which time the reaction mixture was cooled to room temperature. The reaction mixture was treated with 25 g. of sodium hydroxide dissolved in 300 cc. of water. The solid reaction product dissolved to yield a solution containing two layers. The organic layer was separated and the aqueous layer extracted two times with ether. The ether extracts were combined with the organic material and dried over anhydrous sodium sulfate. Distillation of the crude product yielded 55.8 g. (77 percent) of 3-azabicyclo[3.2.2]nonane-3-ethanol, B.P. 87° C. (1.0 mm.)

EXAMPLE 2

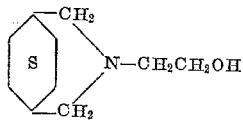

3-azabicyclo[3.2.2]nonane-3-ethanol

*Procedure.*—A solution of 125 g. (1.0 mole) of 3-azabicyclo[3.2.2]nonane in 125 g. of methyl alcohol was placed in a 500 cc. three-neck flask equipped with a stirrer, cold trap, thermometer, and gas inlet tube. The flask was then arranged so that the contents could be heated or cooled by means of a steam-water bath. A nitrogen purge was established through the flask. The solution in the flask was then heated with stirring to 30° C. When the temperature of the solution reached 30° C., the nitrogen purge was stopped and the addition of ethylene oxide was started. A total of 59.5 g. (1.35 moles) of ethylene oxide was added over a 53 minute period while the reaction temperature was maintained below 47° C. After the addition of the ethylene oxide had been completed, the reaction mixture was stirred for 1¾ hours. Distillation of the reaction mixture, after the removal of the methanol, yielded 139 g. (82.5 percent) of 3-azabicyclo[3.2.2]nonane-3-ethanol, B.P. 94° C. (1.8 mm.).

*Analysis.*—Calcd. for C, 71.06%; H, 11.24%; N, 8.29%. Found: C, 70.92; H, 11.0; N, 8.08%.

The alkyl halide substituted compounds of the invention can be prepared by the reaction of an alcohol such as prepared in Examples 1 and 2 with thionyl chloride or thionyl bromide. The reactants are mixed in approximately equimolar proportions with stirring and are then heated under reflux for several hours.

The following example describes the preparation of an acid addition salt of an N-alkyl halide substituted derivative of 3-azabicyclo[3.2.2]nonane, the salt being a quaternary ammonium derivative of a Type II compound of the invention.

EXAMPLE 3

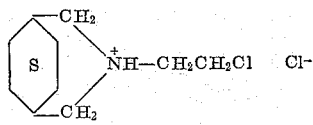

3-(2-chloroethyl)-3-azoniabicyclo[3.2.2]nonane chloride

*Procedure.*—A solution of 33.8 g. (0.2 mole) of 3-azabicyclo[3.2.2]nonane-3-ethanol in 175 cc. of dry benzene was placed in a 500 cc. three-neck flask equipped with a stirrer, condenser, thermometer, and an addition funnel. To this stirred solution was added dropwise 32.1 g. (0.27 mole) thionyl chloride dissolved in 25 cc. of dry benzene. The addition required 20 minutes during which time the temperature of the reaction mixture rose from 29° C. to 63° C. The reaction mixture was then refluxed for 3 hours. The solid product was collected by filtration and washed with benzene giving 42.9 g. (95.5 percent) of 3-(2-chloroethyl)-3-azoniabicyclo[3.2.2]nonane chloride, M.P.—melting point began above 198° C. with complete sublimation above 225° C.

*Analysis.*—Calcd. for $C_{10}H_{19}NCl_2$: N, 6.2%; Cl, 31.79%. Found: N, 6.25%; Cl, 31.65%.

The next example describes the preparation of an N-carbalkoxy substituted quaternary ammonium salt of 3-azabicyclo[3.2.2]nonane, such salt being a quaternary ammonium derivative of a Type III compound of the invention.

EXAMPLE 4

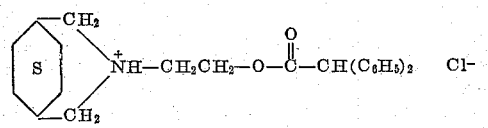

3-[2-(diphenylacetoxy)ethyl]-3-azoniabicyclo[3.2.2]nonane chloride

*Procedure.*—3-(2-chloroethyl)-3-azoniabicyclo[3.2.2]nonane chloride (6.7 g., 0.03 mole) was placed in a separatory funnel and covered with 50 cc. of ether. To this mixture was added a cooled solution of 1.5 g. of sodium hydroxide in 25 cc. of water. The mixture was shaken and the aqueous layer withdrawn and extracted one time with ether. The combined ether layers were dried over anhydrous magnesium sulfate and then poured into a solution of 4.2 g. (0.02 mole) of diphenyl acetic acid in 75 cc. of isopropyl alcohol. The solvent was then distilled through a Vigreux column until a vapor temperature of 80° C. was reached. The material was then distilled at total reflux for 10 hours. The solid that crystallized from the reaction mixture was collected by filtration, giving 7.4 g. (94 percent) of 3-[2-(diphenylacetoxy)ethyl]-3-azoniabicyclo[3.2.2]nonane chloride, M.P. 182–187° C., after recrystallization from isopropyl alcohol.

*Analysis.*—Calcd. for $C_{24}H_{30}NO_2Cl$: N, 3.51%, Cl, 8.87%. Found: N, 3.64%, Cl, 8.68%.

The next example provides a further illustration of the preparation of an N-carbalkoxy derivative of 3-azabicyclo[3.2.2]nonane or a Type III compound of the invention.

EXAMPLE 5

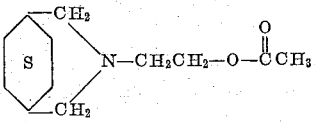

2-(3-azabicyclo[3.2.2]non-3-yl)ethyl acetate

*Procedure.*—3-azabicyclo[3.2.2]nonane-3-ethanol (646 g., 3.82 moles) was heated to 125° C. and 410 g. (4.02 moles) of acetic anhydride was added at a rate sufficient to maintain the reaction temperature at or below 145° C. After the addition had been completed, the reaction mixture was maintained at 145° C. with stirring for two hours. The material then was stripped to a base temperature of 145° C. at 12 mm. The remainder of the product was distilled to yield 768.8 g. (95.5 percent) of 2-(3-azabicyclo[3.2.2]non-3-yl)ethyl acetate, B.P. ca. 111° C. (0.7 mm.), $n_D^{20}$ 1.4841.

*Analysis.*—Calcd. for $C_{12}H_{21}NO_2$: C, 68.26; H, 9.95; N, 6.64. Found: C, 68.23; H, 10.04; N, 6.41.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A compound from the group consisting of (a) compounds of the formulae:

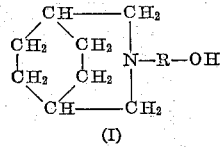

(I)

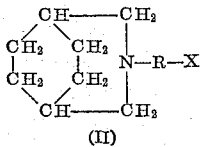

(II)

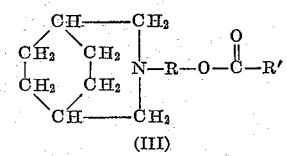

(III)

wherein R is alkylene of 1 to 8 carbon atoms, R' is selected from the group consisting of alkyl of 1 to 8 carbon atoms, phenylalkyl of which the alkyl has 1 to 4 carbon atoms, and diphenylalkyl of which the alkyl has 1 to 4 carbon atoms, and X is halogen; and (b) water soluble non-toxic quaternary ammonium salts of such compounds (I), (II), and (III).

2. 3-azabicyclo[3.2.2]nonane-3-ethanol.

3. 3-(2-chloroethyl)-3-azoniabicyclo[3.2.2]nonane chloride.

4. 3-[2-(diphenylacetoxy)ethyl]-3-azoniabicyclo[3.2.2]nonane chloride.

5. 2-(3-azabicyclo[3.2.2]non-3-yl)ethyl acetate.

References Cited in the file of this patent

Rice et al.: Jour. Organic Chemistry, vol. 24, pages 7–11, 1959.

Malachowski et al.: Berichte, vol. 71, page 760 (1938).